US006565908B1

(12) United States Patent
Daniel et al.

(10) Patent No.: US 6,565,908 B1
(45) Date of Patent: *May 20, 2003

(54) ICE CONFECTION

(75) Inventors: Adrian Daniel, Bedford (GB); Andrew Hoddle, Bedford (GB); Anabela Jones, Bedford (GB); Jon Richard Oldroyd, Bedford (GB); Scott Singleton, Bedford (GB)

(73) Assignee: Good Humor-Breyers Ice Cream, division of Conopco, Inc., Green Bay, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/521,722

(22) Filed: Mar. 9, 2000

(30) Foreign Application Priority Data

Mar. 10, 1999 (GB) .............................................. 9905524
Jul. 23, 1999 (EP) .............................................. 99305842

(51) Int. Cl.[7] .................................................. A23G 9/02
(52) U.S. Cl. ........................ 426/565; 426/101; 426/656; 426/660
(58) Field of Search ................................. 426/565, 101, 426/656, 660

(56) References Cited

U.S. PATENT DOCUMENTS

| | | | |
|---|---|---|---|
| 3,969,531 A | | 7/1976 | Cornelius |
| 4,738,862 A | | 4/1988 | Bee |
| 4,826,656 A | | 5/1989 | Huber et al. |
| 5,118,792 A | | 6/1992 | Warren et al. ............... 530/350 |
| 5,620,732 A | * | 4/1997 | Clemmings et al. |
| 6,017,574 A | * | 1/2000 | Clemmings et al. |
| 6,090,917 A | * | 7/2000 | Lillford et al. |
| 6,096,867 A | * | 8/2000 | Byass et al. |
| 6,156,880 A | * | 12/2000 | Lillford et al. |
| 6,162,789 A | * | 12/2000 | Lillford et al. |
| 6,200,622 B1 | * | 3/2001 | Clemmings et al. |

FOREIGN PATENT DOCUMENTS

| | | |
|---|---|---|
| DE | 197 32 132 A1 | 1/1998 |
| DE | 197 32 135 A1 | 2/1998 |
| EP | 0 843 010 A1 | 5/1998 |
| GB | 1050213 | 12/1966 |
| GB | 1313807 | 4/1973 |
| GB | 2 315 662 A | 2/1998 |
| GB | 2 315 753 A | 2/1998 |
| GB | 2 328 136 A | 2/1999 |
| WO | 92/22581 | 12/1992 |
| WO | 96/39878 | 12/1996 |
| WO | 97/02343 | 1/1997 |
| WO | WO 98/04146 | * 2/1998 |
| WO | 98/04147 | 2/1998 |

(List continued on next page.)

OTHER PUBLICATIONS

"Antifreeze Proteins And Their Potential Use In Frozen Foods", Marilyn Griffith and K. Vanya Ewart, Biotechnology Advances, vol. 13, No. 3, pp. 375–402, 1995.
"A Low–Temperature Scanning Electron Microscopy Study Of Ice Cream, Techniques and General Microstructure", K.B. Caldwell, H.D. Goff and D.W. Stanley, Food Structure, vol. 11 (1992), pp. 1–9.
"Unbiased Estimation Of The Euler–Poincare Characteristic", B. Pinnamaneni, C. Lantuéjoul, J. Jernot and J. Chermant, Acta Stereol, 1989; 8/2, pp. 101–106.

*Primary Examiner*—Nina Bhat
(74) *Attorney, Agent, or Firm*—Gerard J. McGowan, Jr.

(57) ABSTRACT

An ice confection comprising an antifreeze protein, wherein
  $\Delta$ modulus/original modulus $\geq 0.4$, and/or
  $\Delta$ strength/original strength $\geq 0.4$; providing that when $\Delta$ modulus/original modulus $\leq 6.0$, $\Delta$ modulus $\geq 50$ MPa, and/or when $\Delta$ strength/original strength $\leq 2.0$,
  $\Delta$ strength $\geq 0.2$ MPa. Such ice confections have a strong, close-packed continuous network of ice crystals and can be used to manufacture products having novel textures, properties and/or shapes.

9 Claims, 7 Drawing Sheets

FOREIGN PATENT DOCUMENTS

| | | |
|---|---|---|
| WO | 98/04148 | 2/1998 |
| WO | 98/04699 | 2/1998 |
| WO | 98/22591 | 5/1998 |
| WO | 98/41106 | 9/1998 |
| WO | 98/41109 | 9/1998 |
| WO | 99/38386 | 8/1999 |

* cited by examiner

ICE CONFECTION

TECHNICAL FIELD OF THE INVENTION

The invention relates to novel ice confections. In particular the invention relates to novel ice confections containing an antifreeze protein.

BACKGROUND TO THE INVENTION

It is highly desirable to be able to manufacture ice confections having novel shapes, properties and/or textures. Until now, however the ability to provide such a high degree of novelty and interest to the products has been limited. In particular products have to be manufactured with the ability to survive packaging, storage and distribution.

We have now shown that inclusion of specific antifreeze proteins into selected ice confections results in the formation of a strong, close-packed continuous network of ice crystals within the ice confection. As a result the ice confection is provided with specific defined mechanical properties. Such ice confections have novel textures and/or properties. The novel features can be retained during packaging, storage and distribution.

WO 98/04146 (Unilever) discloses that AFPs can be incorporated into frozen food products such as ice confections to provide desirable product properties providing that the product and processing conditions are varied such that the ice crystals provided in the product have an aspect ratio of more than 1.9, preferably from 1.9 to 3.0. The specific examples given are all aerated ice cream compositions. As shown by comparative Examples A to C below, the addition of antifreeze proteins to aerated ice cream does not significantly change the mechanical properties of the ice cream. WO 98/04146 does not teach that it is possible to provide specific ice confection products having novel mechanical properties.

WO 96/39878 (The Pillsbury Company) discloses a method for making a frozen composition for storage, the method not requiring a hardening step prior to storage. The frozen composition contains an antifreeze protein, in particular Type I AFP. Examples show the preparation of an aerated ice cream and an aerated frozen yogurt. As shown by comparative Examples A to C below, the addition of antifreeze proteins to aerated ice cream does not significantly change the mechanical properties of the ice cream. WO 96/39878 does not teach that it is possible to provide specific ice confection products having novel mechanical properties.

U.S. Pat. No. 5,118,792 (Warren et al) discloses the addition of fusion proteins, and in particular the fusion protein protein A-Saf5 into foods which are to be consumed frozen, for example, ice cream, frozen yogurt, ice milk, sherbet, popsicles and frozen whipped cream. No examples are given where a final ice confection product is provided containing such fusion proteins. It is shown in Example 3B that when a popsicle formulation is used within the "splat assay", growth of the ice crystals is restricted.

Surprisingly we have now found that the addition of specific antifreeze proteins to defined ice confections, for example to water ices, ice milks, and unaerated ice cream, results in the formation of a strong, close-packed continuous network of ice crystals within the ice confection providing significant, advantageous changes to the mechanical properties of the ice confection.

DISCLOSURE OF THE INVENTION

Accordingly the invention provides an ice confection comprising an antifreeze protein, wherein $\Delta$ modulus/original modulus $\geq 0.4$, and/or
$\Delta$ strength/original strength $\geq 0.4$, providing that when
$\Delta$ modulus/original modulus $\leq 6.0$, $\Delta$ modulus $\geq 50$ MPa, and/or when $\Delta$ strength/original strength $\leq 2.0$,
$\Delta$ strength $\geq 0.2$ MPa.

Preferably $\Delta$ modulus/original modulus $\geq 0.4$; providing that when $\Delta$ modulus/original modulus $\leq 6.0$, $\Delta$ modulus $\geq 90$ MPa. Most preferably $\Delta$ modulus/original modulus $\geq 1.0$; providing that when $\Delta$ modulus/original modulus $\leq 6.0$, $\Delta$ modulus $\geq 100$ MPa.

Preferably $\Delta$ strength/original strength $\geq 0.7$. Most preferably $\Delta$ strength/original strength $\geq 1.5$.

By modulus is meant the apparent elastic modulus (E) as determined using a four point bend test. Example 1 gives the standard procedure for performing a four point bend test.

Therefore $\Delta$ modulus ($\Delta E$) means the change in modulus between two ice confections whose formulation and process of manufacture are identical in all respects except that the first ice confection includes in its composition an antifreeze protein, and the second ice confection has no antifreeze protein included in its composition (the control composition). Original modulus ($E_{orig}$) is the modulus measured in the control composition.

By strength is meant the flexure strength ($\sigma_u$) which can be defined as the maximum stress that a material can withstand, under the particular conditions. The flexure strength is given by the stress at a point of maximum force on the force versus displacement curve recorded during a four point bend test.

Therefore $\Delta$ strength ($\Delta\sigma_u$) means the change in strength between two ice confections whose formulation and process of manufacture are identical in all respects except that the first ice confection includes in its composition an antifreeze protein, and the second ice confection has no antifreeze protein included in its composition (the control composition). Original strength ($\sigma_{u\ orig}$) is the modulus measured in the control composition.

In addition to changes in the apparent elastic modulus and flexure strength, an increase in product hardness is provided by the ice confections according to the invention. For ice confections frozen with agitation, for example in an ice cream freezer (such as a scraped surface heat exchanger), the increase in hardness can be measured using the Vickers hardness test. Details of the Vickers hardness test are given in Example 3.

The degree to which the Vickers Hardness ($H_v$) of the ice confection is increased by the addition of the antifreeze protein depends in part on the ice content of the ice confection.

However, generally $\Delta H_v/H_{v\ orig} \geq 0.3$, providing that when $\Delta H_v/H_{v\ orig} \leq 5.0$, $\Delta H_v \geq 0.3$.

Preferably $\Delta H_v/H_{v\ orig} \geq 1.0$, providing that when $\Delta H_v/H_{v\ orig} \leq 5.0$, $\Delta H_v \geq 1.25$.

Most preferably either $\Delta H_v/H_{v\ orig} \geq 6.0$ or $\Delta H_v/H_{v\ orig} \leq 6.0$ and $\Delta H_v \geq 2.0$.

Where $\Delta H_v$ is the change in Vickers Hardness between two ice confections whose formulation and process of manufacture are identical in all respects except that the first ice confection includes in its composition an antifreeze protein, and the second ice confection has no antifreeze protein included in its composition (the control composition). $H_{v\ orig}$ is the original Vickers Hardness measured in the control composition.

By close-packed continuous network of ice crystals is meant that any given ice crystal is connected to at least one other ice crystal.

In unaerated ice confections which have been frozen with agitation, the degree of network formation can be measured as contiguity. Contiguity is defined as the ratio of the particle to particle interface area divided by the total interface area. It is thus a measure of the degree of network formation of the particle phase. Example 4 shows a method for the measurement of contiguity.

Unaerated ice confections according to the invention have a contiguity of at least 0.2, as measured by the test given in Example 4, for an ice content of from 50–90%, preferably 54–85% by weight, when measured at −18° C.

In unaerated ice confections which have been frozen by any means, the degree of network formation can be measured as the Euler-Poincare characteristic of the ice phase. The Euler-Poincare characteristic is a measure of the degree of network formation of a particular phase. The lower and more negative the value of the Euler-Poincare characteristic, the greater the continuity of the phase in question. Example 5 shows a method for the measurement of the Euler-Poincare characteristic.

Unaerated ice confections according to the invention have an ice phase Euler-Poincare characteristic of less than −150 mm$^{-2}$ as measured by the test given in Example 5 for an ice content of from 50–90%, preferably 54–85% by weight when measured at −18° C.

By antifreeze protein (AFP) is meant a protein which has significant ice recrystallisation inhibition properties as measured in accordance with Example 2. The AFP provides an ice particle size upon recrystallisation of less than 20 $\mu$m, more preferred from 5 to 15 $\mu$m.

Preferably the ice confection comprises at least 0.0005% by weight antifreeze protein, more preferably 0.0025% by weight antifreeze protein. Typically the ice confection will comprise from 0.0005% by weight to 0.005% by weight antifreeze protein.

For some applications it may be advantageous to include a mixture of two or more different AFPs into the food product.

The AFP for use in products of the invention can be any AFP suitable for use in food products. Examples of suitable sources of AFP are for example given in the article "Antifreeze proteins and their potential use in frozen food products", Marylin Griffith and K. Vanya Ewart, Biotechnology Advances, vol 13, pp375–402, 1995 and in patent applications WO 98/04699, WO 98/04146, WO 98/04147, WO 98/04148 and WO 98/22591.

The AFPs can be obtained from their sources by any suitable process, for example the isolation processes as described in the above mentioned documents.

One possible source of AFP materials is fish. Examples of fish AFP materials are antifreeze glycoproteins (AFGP) (for example obtainable from Atlantic cod, Greenland cod and Tomcod), Type I AFP (for example obtainable from Winter flounder, Yellowtail flounder, Shorthorn sculpin and Grubby sculpin), Type II AFP (for example obtainable from Sea raven, Smelt and Atlantic herring) and Type III AFP (for example obtainable from Ocean Pout, Atlantic wolffish, Radiated shanny, Rock gunnel and Laval's eelpout). A preferred example of the latter type is described in WO 97/02343.

Another possible source of AFP material are invertebrates. Also AFPs may be obtained from Bacteria.

A third possible source of AFP material are plants. Examples of plants containing AFPs are garlic-mustard, blue wood aster, spring oat, winter cress, winter canola, Brussels sprout, carrot, Dutchman's breeches, spurge, daylily, winter barley, Virginia waterleaf, narrow-leaved plantain, plantain, speargrass, Kentucky bluegrass, Eastern cottonwood, white oak, winter rye, bittersweet nightshade, potato, chickweed, dandelion, spring and winter wheat, triticale, periwinkle, violet and grass.

Both natural occurring species may be used or species which have been obtained through genetic modification. For example micro-organisms or plants may be genetically modified to express AFPs and the AFPs may then be used in accordance to the present invention.

Genetic manipulation techniques may be used to produce AFPs. Genetic manipulation techniques may be used to produce AFPs having at least 80%, more preferred more than 95%, most preferred 100% homology to the AFPs directly obtained from the natural sources. For the purpose of the invention these AFPs possessing this high level of homology are also embraced within the term "AFPs".

The genetic manipulation techniques may be used as follows: An appropriate host cell or organism would be transformed by a gene construct that contains the desired polypeptide. The nucleotide sequence coding for the polypeptide can be inserted into a suitable expression vector encoding the necessary elements for transcription and translation and in such a manner that they will be expressed under appropriate conditions (for example in proper orientation and correct reading frame and with appropriate targeting and expression sequences). The methods required to construct these expression vectors are well known to those skilled in the art.

A number of expression systems may be utilised to express the polypeptide coding sequence. These include, but are not limited to, bacteria, yeast insect cell systems, plant cell culture systems and plants all transformed with the appropriate expression vectors.

A wide variety of plants and plant cell systems can be transformed with the nucleic acid constructs of the desired polypeptides. Preferred embodiments would include, but are not limited to, maize, tomato, tobacco, carrots, strawberries, rape seed and sugar beet.

For some natural sources the AFPs may consist of a mixture of two or more different AFPs.

Preferably the antifreeze protein is chosen such that it gives an aspect ratio of more than 1.9 to the ice crystal, preferably from 1.9 to 3.0, more preferably from 2.0 to 2.9, even more preferred from 2.1 and 2.8 (see WO 98/04146). In particular antifreeze proteins which provide an aspect ratio of more than 1.9 to the ice crystal are the preferred AFP for addition to aerated ice confections. Aspect ratio is defined as the maximum diameter of a particle divided by its minimum diameter. The aspect ratio can be determined by any suitable method. A preferred method is illustrated in the Examples (Example 6).

For the purpose of the invention the preferred AFPs are derived from fish. Especially preferred is the use of fish proteins of the type III, most preferred HPLC 12 as described in our case WO 97/02343. In particular AFP type III HPLC 12 is the preferred AFP for addition to aerated ice confections.

Ice confections which show the required change in mechanical properties on the addition of the antifreeze protein include unaerated milk containing frozen confections such as ice-cream, frozen yoghurt, and frozen custard, aerated and unaerated sherbet and milk ice, as well as aerated and unaerated frozen confections which do not typically contain milk such as water ices, sorbet, granitas and frozen fruit purees.

Preferably the ice confection is selected from an unaerated ice cream, an unaerated or aerated water ice and an unaerated or aerated milk ice.

Most preferably the ice confection is selected from an unaerated water ice, an aerated water ice or unaerated milk ice.

By water ice is meant a frozen solution made essentially from sugar, water, fruit acid or other acidifying agent, colour, fruit or fruit flavouring.

By unaerated is meant an ice confection having an overrun of less than 25% (equivalent to 0.2 volume fraction of air), preferably less than 10% (equivalent to 0.09 volume fraction of air). During the processing of the ice confection no deliberate steps such as whipping are undertaken to increase the gas content of the product. However, it should be realised that during normal methods for the preparation of non-aerated ice confections, low levels of gas or air may be incorporated into the product, for example due to the mixing conditions used.

Ice confections having an antifreeze protein included in their composition, such that the mechanical properties of the ice confection are changed as defined, can provide many new interesting products having different shapes, textures and properties.

The ice confection containing the antifreeze protein may constitute the entire product or may be a component of a composite product.

An example of a product which may be manufactured using ice confections having an antifreeze protein included in their composition, such that the mechanical properties of the ice confection are changed as defined, are shaped products which have a high degree of definition.

There is an increasing demand, particularly in children's ice confections, to be able to provide products having complex shapes such as cartoon characters and the like, however to date such products cannot be produced having a high degree of definition. Further small protruding features such as hands or beaks are liable to break off during manufacture, packaging, storage or transportation.

An example of what is meant by "high degree of definition" would be a product having protrusions which are typically greater than 3 mm in length and may be as long as 5 cm or more, whilst having a thickness of only 1 to 5 mm. Such protrusions would not normally be able to withstand standard manufacture packaging, storage and transportation processes.

We are now able to provide such shaped products by the use of an ice confection having the mechanical properties as defined above.

The ice confection will typically have an ice content of at least 30% by volume when measured at −18° C., more preferably at least 40% by volume when measured at −18° C., most preferably at least 50% by volume when measured at −18° C.

The ice content may be determined following the techniques described in the article by B de Cindio and S Correra in the Journal of Food Engineering, Volume 24, pages 405–415, 1995. The enthalpy data required for this technique is obtained using adiabatic calorimetry (Holometrix Adiabatic Calorimeter). The ice contents as expressed herein are measured on an 80 g sample poured into the sample holder of the calorimeter and cooled to −75° C. by placing the assembly in dry ice prior to placing in the calorimeter (precooled to between −70° C. and −80° C.). The enthalpy data obtained was analysed to give ice content as a function of the temperature following the method of Cindio and Carrera.

In general the ice confection has a total soluble solids content of less than 40% by weight, preferably less than 25% by weight, most preferably less than 15% by weight. For low calorie products the total soluble solids content may be as low as, for example, approximately 5% by weight.

The total soluble solids content is measured at 4° C. and is the % by weight of the total composition that is dissolved at that temperature.

It has further been observed that products according to the invention retain their structural integrity for longer when held at ambient temperatures.

DESCRIPTION OF THE DRAWINGS

FIG. 3 shows a comparison of the apparent modulus measured for Examples 7–10 compared to a control sample.

FIG. 4 shows a comparison of the flexure strength measured for Examples 7–10 compared to a control sample.

FIG. 5 shows a comparison of the Vickers Hardness measured for Examples 7–10 compared to a control sample.

FIG. 6 shows a comparison of the apparent modulus measured for Example 11 compared to Comparative Examples A, B, & C and relevant control samples.

FIG. 7 shows a comparison of the flexure strength measured for Example 11 compared to Comparative Examples A, B, & C and relevant control samples.

FIG. 8 shows a comparison of the Vickers Hardness measured for Example 11 compared to Comparative Examples A, B, & C and relevant control samples.

FIG. 9 shows a comparison of the apparent modulus measured for Examples 12–16 compared with relevant control samples.

FIG. 10 shows a comparison of the flexure strength measured for Examples 12–16 compared with relevant control samples.

FIG. 11 shows a comparison of the Vickers Hardness measured for Examples 12–16 compared with relevant control samples.

FIG. 12 shows a comparison of the apparent modulus measured for Examples 17–20 compared with a control sample.

FIG. 13 shows a comparison of the flexure strength measured for Examples 17–20 compared with a control sample.

FIG. 14 shows a comparison of the Vickers Hardness measured for Examples 17–20 compared with a control sample.

FIG. 15 shows a comparison of the apparent modulus measured for Examples 21–24 compared with a control sample.

FIG. 16 shows a comparison of the flexure strength measured for Examples 21–24 compared with a control sample.

FIG. 17 shows a comparison of the apparent modulus measured for Examples 25–28 compared with relevant control samples.

FIG. 18 shows a comparison of the flexure strength measured for Examples 25–28 compared with relevant control samples.

FIG. 19 shows a comparison of the Vickers Hardness measured for Examples 25–28 compared with relevant control samples.

EXAMPLES

The invention will now be illustrated by means of the following examples:

Example 1

Four Point Bend Test

The standard four point bend test can be used to determine a number of mechanical properties of ice confection materials. The mechanical properties being measured are Young's modulus (apparent) and flexure strength.

Figure 1:
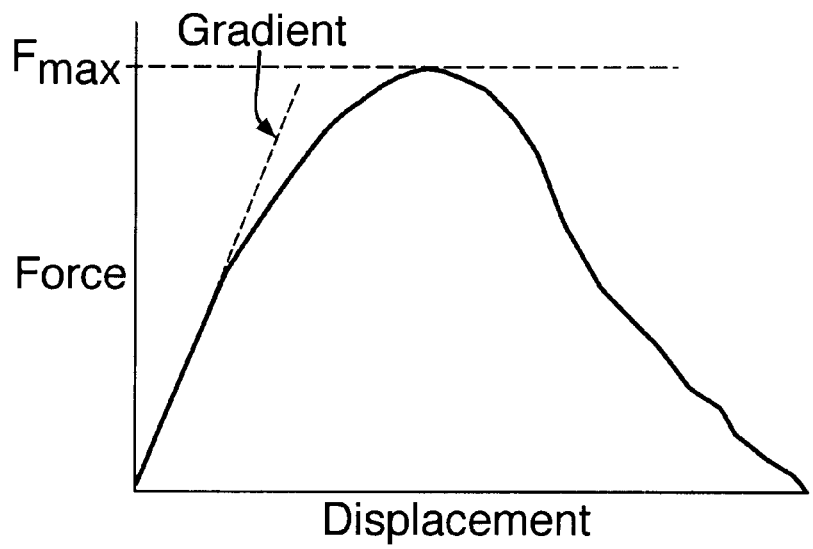
FIG. 1 shows a schematic of the data recorded during a four-point bend test.

In a bend test, a test piece is deformed whilst measuring the applied force and test piece deflection. A schematic data set for an ice confection is shown in FIG. 1. The apparent elastic modulus is determined by the gradient of the initial linear part of this curve.

The 4-point bend test requires production of a parallel sided rectangular bar of ice confection material. This may be obtained by any suitable means.

In this particular application the parallel sided rectangular bar of ice confection was made using aluminium moulds producing bars having the dimensions 25×25×200 mm.

a) Quiescent Frozen Ice Confections

The liquid ice confection pre-mix was poured into a mould which had been pre-cooled in a blast freezer at −35° C. for at least 30 minutes, the mould was then placed in a blast freezer at −35° C. for at least 2 hours. The samples were then de-moulded and stored at −25° C. until testing (conducted after 5–6 days). 18 to 24 hours prior to testing the samples were equilibrated by storing at −18° C., the temperature at which all tests were performed. A minimum of 10 bars was tested for each sample set and the mean value of each sample set was recorded as the value of the mechanical property being measured.

b) Ice Confections Frozen with Agitation

The ice confection was extruded from the ice cream freezer (scraped surface heat exchanger) at a temperature of from −1° C. to −5° C., depending on the ice confection, into a mould which had been pre-cooled in a blast freezer at −35° C. for at least 30 minutes, the mould was lined with silicon paper to prevent ice-metal adhesion. The sample was then prepared as above for quiescent frozen samples.

The general test applied to all types of solids is described in "Biomechanics Materials. A practical Approach" Ed. J. F. V. Vincent, Pub. IRL Press, Oxford University Press, Walton Street, Oxford, 1992 and "Handbook of Plastics Test materials" Ed. R. P. Brown, Pub. George Godwin Limited, The Builder Group, 1–3 Pemberton Row, Fleet Street, London, 1981. Testing involves placing each bar onto 2 supports and bending it until fracture by applying pressure from two upper supports, that are separated by 85 mm, centrally on the bar's top surface. The force applied in bending and the displacement of the moving contact is recorded throughout the test. The speed of descent of the moving support was 50 mm per minute.

The apparent elastic modulus of the material is given by the equation;

$$E = \frac{(0.21) \cdot gradient \cdot S^3}{BD^3}$$

where the gradient is that shown in FIG. 1, S is the span (distance) between the supporting contacts beneath the test bar, B is the width of the bar and D is the depth of the bar.

For these tests the span (S) was 170 mm.

With reference to FIG. 1, the strength of a material under three point bend conditions, is given as;

$$\sigma_u = \frac{(0.75) \cdot F_{max} S}{BD^2}$$

where $\sigma_u$ is the flexure strength and $F_{max}$ is the maximum force recorded.

Example 2

Method of determining whether an AFP possesses ice recrystallisation inhibition properties Recrystallisation inhibition properties can measured using a modified "splat assay" (Knight et al, 1988). 2.5 μl of the solution under investigation in 30% (w/w) sucrose is transferred onto a clean, appropriately labelled, 16 mm circular coverslip. A second coverslip is placed on top of the drop of solution and the sandwich pressed together between finger and thumb. The sandwich is dropped into a bath of hexane held at −80° C. in a box of dry ice. When all sandwiches have been prepared, sandwiches are transferred from the −80° C. hexane bath to the viewing chamber containing hexane held at −6° C. using forceps pre-cooled in the dry ice. Upon transfer to −6° C., sandwiches can be seen to change from a transparent to an opaque appearance. Images are recorded by video camera and grabbed into an image analysis system (LUCIA, Nikon) using a 20×objective. Images of each splat are recorded at time=0 and again after 60 minutes. The size of the ice-crystals in both assays is compared by placing the slides within a temperature controlled cryostat cabinet (Bright Instrument Co Ltd, Huntington, UK). Images of the samples are transferred to a Quantimet 520 MC image analysis system (Leica, Cambridge UK) by means of a Sony monochrome CCD videocamera. Ice crystal sizing was performed by hand-drawing around ice-crystal. At least 400 crystals were sized for each sample. The ice crystal size was taken as being the longest dimension of the 2D projection of each crystal. The average crystal size was determined as the number average of the individual crystal sizes. If the size at 30–60 minutes is similar or only moderately (less than 10%) increased compared to the size at t=0, and/or the crystal size is less than 20 micrometer, preferably from 5 to 15 micrometer this is an indication of good ice recrystallisation inhibition properties

Example 3

Standard Vickers Hardness Test

The Vickers Hardness test is an indentation test that involves pushing a pyramid shaped indentor into the surface of material and recording the force applied as a function of tip displacement. Force and displacement are measured during the indentation loading cycle and the unloading cycle.

The test is described in "Handbook of Plastics Test materials" Ed. R. P. Brown, Pub. George Godwin Limited, The Builder Group, 1–3 Pemberton Row, Fleet Street, London, 1981.

Figure 2:
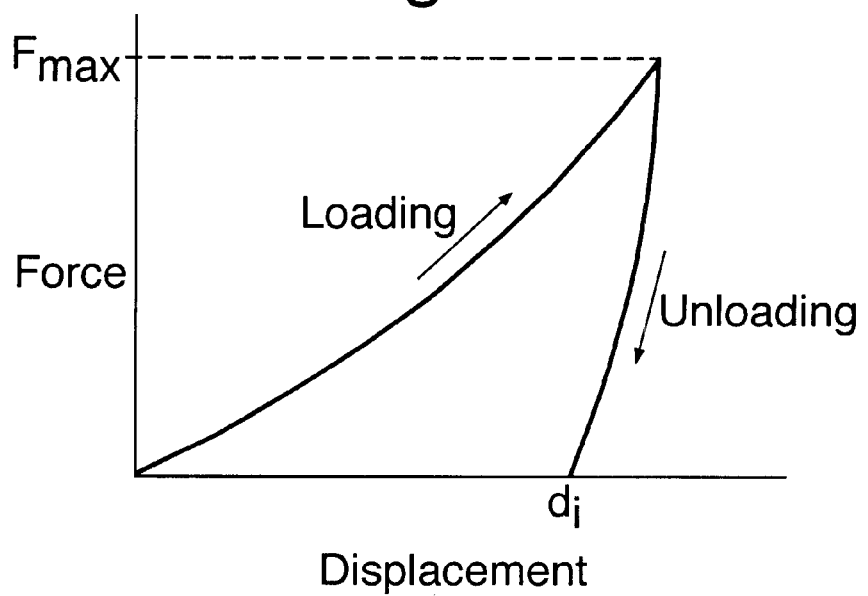
FIG. 2 shows a schematic diagram of typical force vs. displacement curve for a Vickers Hardness Test.

The Vickers pyramid geometry is an engineering industry standard (BSi 427, 1990). It has an apex angle at the tip of 136°. Hardness is determined as;

$$H_V = \frac{F_{max}}{A}$$

where $H_v$ is the Vickers Hardness, $F_{max}$ is the maximum applied force (see FIG. 2) and A is the projected area of the indentation left in the material's surface. The area A is determined by assuming the indentation has the same geometry as the indentor that formed it, i.e. a Vickers pyramid, and therefore the projected area can be determined from the indent depth given by $d_i$ in FIG. 2.

$$A = 24.5 d_i^2$$

The Vickers Hardness of a material is a measure of the material's resistance to plastic deformation.

The test samples were 500 ml blocks, manufactured by extruding the ice confection (typically at a temperature of from −1° C. to −5° C.) from a scraped surface heat exchanger into standard 500 ml packets and then placing the packets into a blast freezer at −35° C. for two hours prior to storage at −25° C. Prior to testing the samples were equilibrated overnight at the required test temperature of −18° C.

Measurements were conducted on a universal testing machine made by Instron (code 4500), within a temperature controlled cabinet at −18° C. The crosshead speed was 2.0 mm/min. The maximum load was 95N. The pyramid tip pushed into the surface of the material to a depth of 1.5 mm for a water ice and 2.5 mm for an ice cream.

Example 4

Measurement of Contiguity

Contiguity is measured using microstructural images of the ice confection using cryogenic Scanning Electron Microscopy (SEM). Structures are imaged using the technique described in "A low temperature scanning electron microscopy study of ice cream. I. Techniques an general microstructure" Food Structure Vol. 11 (1992), pp 1–9.

In a particulate composite, the Contiguity of the particulate phase is defined as the ratio of the particle to particle interface area divided by the total internal interface area. It is a measure of the degree of network formation of the particulate phase. In ice confections the particles are ice crystals within the matrix and thus contiguity of the ice is defined as;

$$C_{ii} = \frac{A_{ii}}{(A_{ii} + A_{im})}$$

where $C_{ii}$ is the contiguity, $A_{ii}$ is the total interfacial surface area of ice-ice interfaces and $A_{im}$ is the interfacial surface area of ice-matrix interfaces. Contiguity can be measured from microstructural images of random planar surfaces cut through the material. Cryo-SEM images of flat fracture surfaces of unaerated ice confection are sufficient for this.

By placing an array of lines on the image of the microstructure, the number of intercepts of these lines with ice-ice and ice-matrix interfaces are counted and combined in the following equation, to give the contiguity;

$$C_{ii} = \frac{2N_{ii}}{(2N_{ii} + N_{im})}$$

where $N_{ii}$=number per unit length of ice-ice intercepts and $N_{im}$=number per unit length of ice-matrix intercepts.

Ideally, approximately 800 interfaces were counted from a total of 5 images that are representative of each sample's structure.

To determine contiguity, two sets of measurements were taken from each image. After placing a regular set of lines onto the image, the number of intercepts of the ice-matrix and ice-ice interfaces with these lines were counted, only including all obvious ice-ice interfaces. The count was then repeated, but this time with all possible ice-ice interfaces included. As such, a maximum ice contiguity measurement and a minimum ice contiguity measurement was made for each image. The mean of these figures is then taken as the contiguity value.

Example 5

Measurement of Euler-Poincare Characteristic

The Euler-Poincare characteristic is measured using microstructural images of the ice confection using cryogenic Scanning Electron Microscopy (SEM). Structures are imaged using the technique described in "A low temperature scanning electron microscopy study of ice cream. I. Techniques on general microstructure" Food Structure Vol. II (1992), pp 1–9.

In a two-phase composite structure, the degree of continuity of one phase can be measured using the Euler-Poincare characteristic. The lower value of the Euler-Poincare characteristic for a phase, the more continuous or connected that phase is within the microstructure. The Euler-Poincare characteristic can be a positive or negative number. The definition of the Euler-Poincare characteristic is given in "Unbiased estimation of the Euler-Poincare characteristic"by B. P. Pinnamaneni, C. Lantuejoul, J. P. Hernot and J. L. Chermant, Acta Sterelogica, 1989, 8/2, p101–106.

To measure the Euler-Poincare characteristic for ice in ice confections, identification of the ice and matrix phases on the microstructural images was performed and using an image analysis system, the ice phase Euler-Poincare characteristic was determined using a specifically written analysis program. Whenever contrast in the images was insufficient for the image analysis system to automatically distinguish ice and matrix separately, the interface between the two was identified manually, thus enabling accurate determination of the Euler-Poincare characteristic.

The Euler-Poincare characteristic can be measured for ice in an ice confection produced by any processing route.

Example 6

Aspect Ratio Measurement Samples were equilibrated at −18° C. in a Prolan environmental cabinet for approximately 12 hours. Microscopic slides were prepared by smearing a thin layer of ice confection from the centre of thin glass plates.

Each slide was transferred to a temperature controlled microscopic stage (at −18° C.) where images of ice crystals (about 400 individual ice crystals) were collected and relayed through a video camera to an image storage and analysis system.

The stored ice crystal images were highlighted manually by drawing around its perimeter which then highlights the whole crystal. Images of the highlighted crystals were then measured using the image analysis software which counts the number of pixels required to complete the longest diameter (length), shortest diameter (breadth), the aspect ratio (length/breadth).

The average aspect ratio for the crystals was calculated.

Examples 7 to 10

An ice cream composition was prepared having the following formulation;

| | weight % |
|---|---|
| Sucrose | 13.000 |
| Skimmed Milk Powder | 10.000 |

-continued

|  | weight % |
|---|---|
| Butter fat | 8.000 |
| Maltodextrin 40 | 4.000 |
| Monoglycerol Palmitate (MGP) | 0.300 |
| Locust Bean Gum | 0.144 |
| Carageenan L100 | 0.016 |
| Flavour | 0.012 |
| Water | to 100 |

Total soluble solids; 35% by weight
Ice content at −18° C.; 54% by weight

All the ice cream ingredients were mixed together using a high shear mixer for approximately 3 minutes. The water being added at a temperature of 80° C. The temperature of the water ice mix was approximately 55–65° C. after mixing.

The mix was then homogenized (2000 psi) and passed through to a plate heat exchanger for pasteurization at 81° C. for 25 seconds. The mix was then cooled to approximately 4° C. in the plate heat exchanger prior to use.

After pasteurisation Type III AFP (as described in WO 97/02343) was added to the ice cream pre-mix in the following concentrations;

Example 7—0.0005% by weight
Example 8—0.0025% by weight
Example 9—0.005% by weight
Example 10—0.001% by weight The ice cream pre-mix was then frozen using a Technohoy MF 75 scraped surface heat exchanger, no overrun was introduced into the ice cream. The ice cream was extruded at a temperature of from −4.3° C. to −4.6° C. The product was then hardened in a blast freezer at −35° C., then stored at −25° C.

The apparent elastic modulus and the flexure were determined using a four point bend test as described in Example 1.

Figure 3:
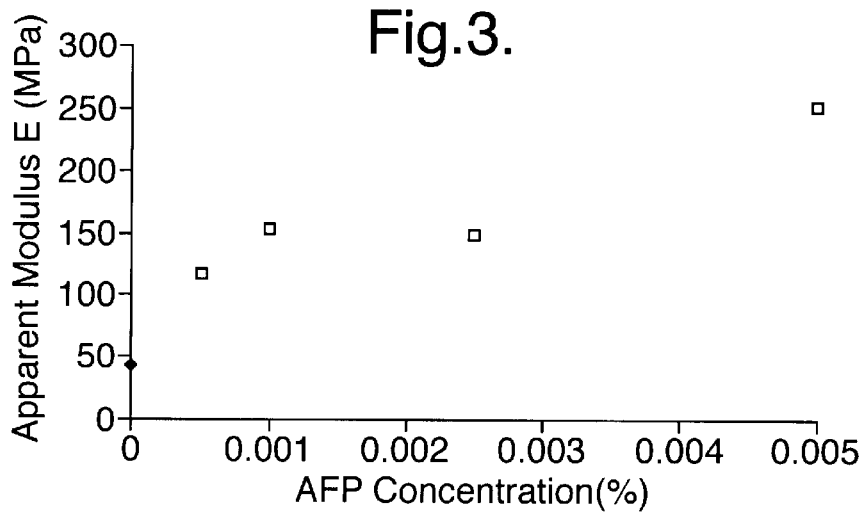
In FIGS. 3 to 19, AFP containing examples are shown by (□), control samples containing no AFP are shown by (♦)
Figure 4:
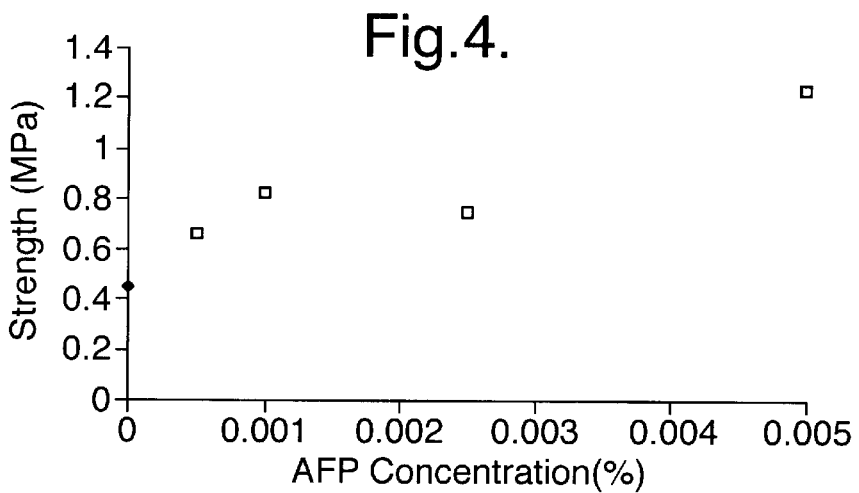

Results were compared with a control sample containing no AFP. Results are shown in FIGS. 3 and 4 where AFP containing examples are shown by (□) and control samples containing no AFP are shown by (♦).

Δ modulus, Δ modulus/original modulus, Δ strength and Δ strength/original strength were calculated. Results are shown in Table 1.

Figure 5:
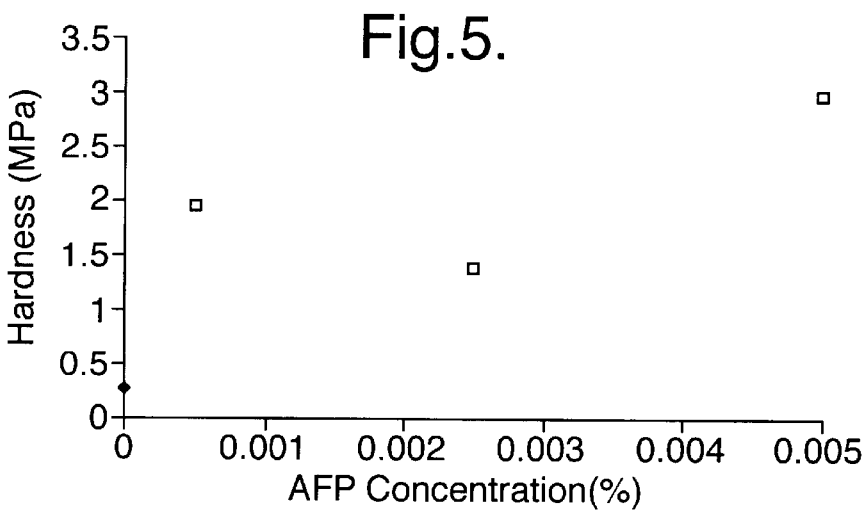

The Vickers Hardness was also determined using the method given in Example 3 results are shown in FIG. 5 where AFP containing examples are shown by (□) and control samples containing no AFP are shown by (♦).

$\Delta H_v/H_{v\ orig}$ and $\Delta H_v$ were calculated. Results are shown in Table 1.

TABLE 1

| Example | ΔE (MPa) | ΔE/ $E_{orig}$ | $\Delta\sigma_v$ (MPa) | $\Delta\sigma_v/\sigma_{v\ orig}$ | $\Delta H_v$ (MPa) | $\Delta H_v/H_v$ orig |
|---|---|---|---|---|---|---|
| 7 | 7.3 | 1.7 | 0.2 | 0.47 | 1.65 | 6.2 |
| 8 | 104.8 | 2.46 | 0.3 | 0.67 | 1.25 | 9.0 |
| 9 | 208.3 | 4.9 | 0.8 | 1.76 | 2.7 | 10.2 |
| 10 | 109.6 | 2.58 | 0.37 | 0.8 | — | — |

Example 11, Comparative Examples A to C

An ice cream pre-mix having the formulation of Example 8 was prepared as described for Example 8, the pre-mix was then frozen as described for Example 8 with the following overruns (volume fraction of air ($V_{air}$)).

Example 11—No overrun (0)
Comparative Example A—43% overrun (0.3)
Comparative Example B—67% overrun (0.4)
Comparative Example C—100% overrun (0.5)

The apparent elastic modulus and the flexure strength were determined using a four point bend test as described in Example 1.

Figure 6:
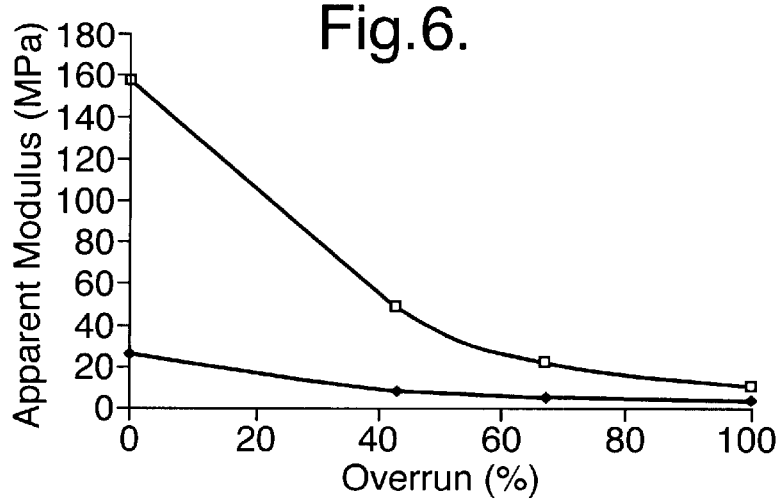
Figure 7:
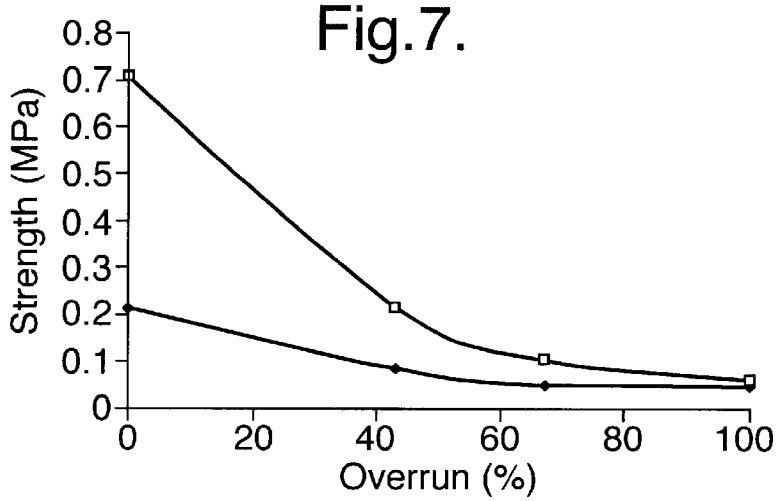

Results were compared with relevant control samples containing no AFP. Results are shown in FIGS. 6 and 7 where AFP containing examples are shown by (□) and control samples containing no AFP are shown by (♦).

Δ modulus, Δ modulus/original modulus, Δ strength and Δ strength/original strength were calculated. Results are shown in Table 2.

Figure 8:
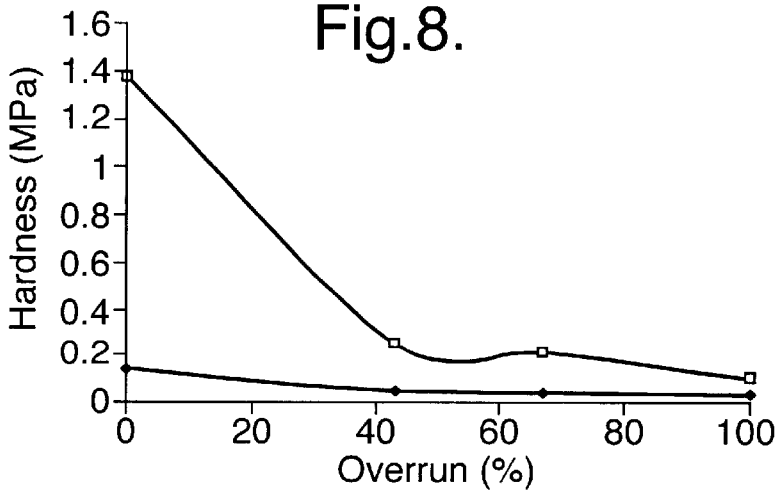

The Vickers Hardness was also determined using the method given in Example 3 results are shown in FIG. 8 where AFP containing examples are shown by (□) and control samples containing no AFP are shown by (♦).

$\Delta H_v/H_{v\ orig}$ and $\Delta H_v$ were calculated. Results are shown in Table 2.

TABLE 2

| Example | ΔE (MPa) | ΔE/ $E_{orig}$ | $\Delta\sigma_v$ (MPa) | $\Delta\sigma_v/\sigma_{v\ orig}$ | $\Delta H_v$ (MPa) | $\Delta H_v/H_v$ orig |
|---|---|---|---|---|---|---|
| 11 | 132 | 5.1 | 0.5 | 2.3 | 1.25 | 8.9 |
| A | 40 | 4.7 | 0.1 | 1.5 | 0.2 | 4.0 |
| B | 17 | 3.3 | 0.05 | 1.1 | 0.15 | 4.3 |
| C | 6.6 | 1.6 | 0.02 | 0.4 | 0.05 | 2.1 |

Examples 12 to 16

A water ice solution having the following composition was prepared as follows;

|  | % by weight |
|---|---|
| Sucrose | 25 |
| Locust Bean Gum | 0.5 |
| Hydrolysed milk protein (Hyfoama DS**) | 0.1 |
| Type III AFP* | 0.0025 |
| water | to 100 |

*as described in WO 97/02343
**Hyfoama DS is a trademark from Quest International Total soluble solids; 25.5% by weight
Ice Content at −18° C.; 62% by weight All the water ice ingredients except AFP were mixed together using a high shear mixer for approximately 3 minutes. The water being added at a temperature of 80° C. The temperature of the water ice mix was approximately 55–65° C. after mixing.

The mix was then passed through to a plate heat exchanger for pasteurization at 81° C. for 25 seconds. The mix was then cooled to approximately 4° C. in the plate heat exchanger prior to use.

The AFP was added after pasteurisation.

The water ice solution was frozen in a Technohoy MF 75 scraped surface heat exchanger with the following overruns (volume fraction of air). The water ice was extruded at a temperature of from −3.8° C. to −4.5° C. The product was then hardened in a blast freezer at −35° C., then stored at −25° C.

Example 12—No overrun (0)
Example 13—20% overrun (0.167)
Example 14—30% overrun (0.23)

Example 15—43% overrun (0.3)

Example 16—67% overrun (0.4)

The apparent elastic modulus and the flexure strength were determined using a four point bend test as described in Example 1.

Figure 9:
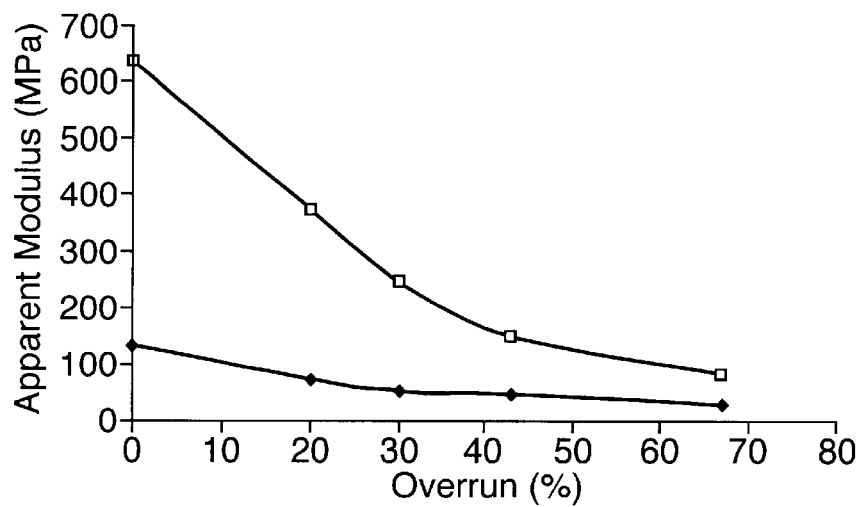
Figure 10:
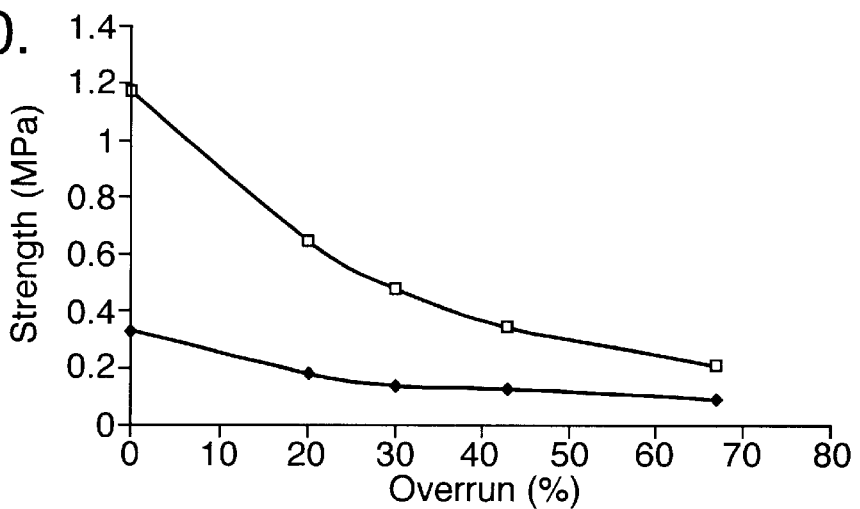

Results were compared with a control sample containing no AFP. Results are shown in FIGS. 9 and 10 where AFP containing examples are shown by (□) and control samples containing no AFP are shown by (♦).

Δ modulus, Δ modulus/original modulus, Δ strength and Δ strength/original strength were calculated. Results are shown in Table 3.

Figure 11:
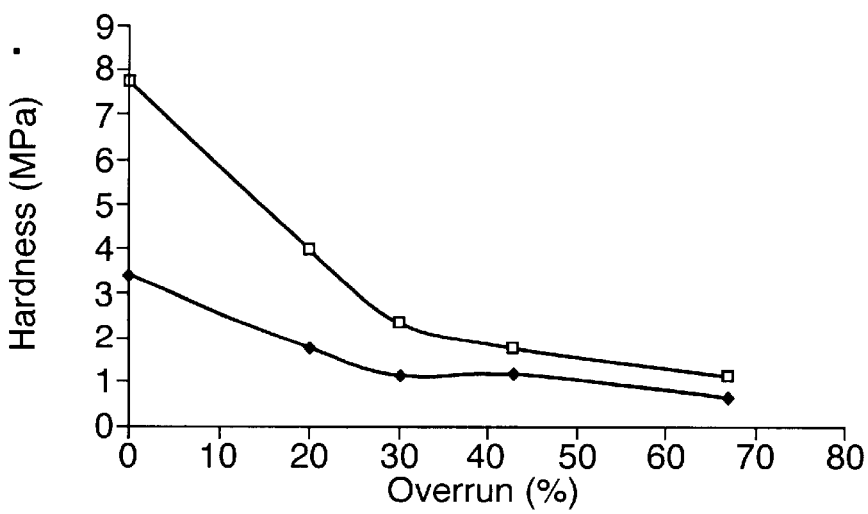

The Vickers Hardness was also determined using the method given in Example 3 results are shown in FIG. 11 where AFP containing examples are shown by (□) and control samples containing no AFP are shown by (♦).

$\Delta H_{v/H_v\ orig}$ and $\Delta H_v$ were calculated. Results are shown in Table 3.

TABLE 3

| Example | ΔE (MPa) | ΔE/ $E_{orig}$ | $\Delta \sigma_v$ (MPa) | $\Delta \sigma_v/\sigma_{v\ orig}$ | $\Delta H_v$ (MPa) | $\Delta H_v/H_v$ orig |
|---|---|---|---|---|---|---|
| 12 | 500.3 | 3.7 | 0.8 | 2.5 | 4.35 | 1.3 |
| 13 | 300.7 | 4.1 | 0.5 | 2.6 | 2.2 | 1.3 |
| 14 | 193.4 | 3.7 | 0.3 | 2.6 | 1.25 | 1.1 |
| 15 | 101.5 | 2.1 | 0.2 | 1.7 | 0.6 | 0.5 |
| 16 | 52.1 | 1.9 | 0.1 | 1.5 | 0.45 | 0.7 |

Examples 17–20

A water ice solution having the following composition was prepared as follows;

|  | Weight % |
|---|---|
| Sucrose | 20.0 |
| Locust Bean Gum | 0.2 |
| Water | to 100 |

Total soluble solids; 20.2% by weight

Ice content at −18° C.; 70% by weight

The water ice solution was prepared as in Example 12.

After pasteurisation Type III AFP (as described in WO 97/02343) was added to the water ice solution in the following concentrations;

Example 17—0.0005%

Example 18—0.0011%

Example 19—0.0025%

Example 20—0.005%

The water ice solution was frozen in a Technohoy MF 75 scraped surface heat exchanger with no overrun being introduced. The water ice was extruded at a temperature of from −3.9° C. to −5.6° C. The product was then hardened in a blast freezer at −35° C., then stored at −25° C.

The apparent elastic modulus and the flexure strength were determined using a four point bend test as described in Example 1.

Figure 12:
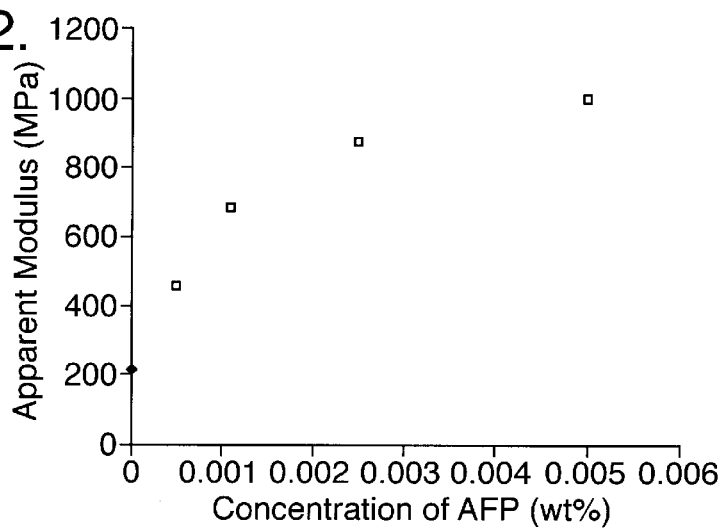
Figure 13:
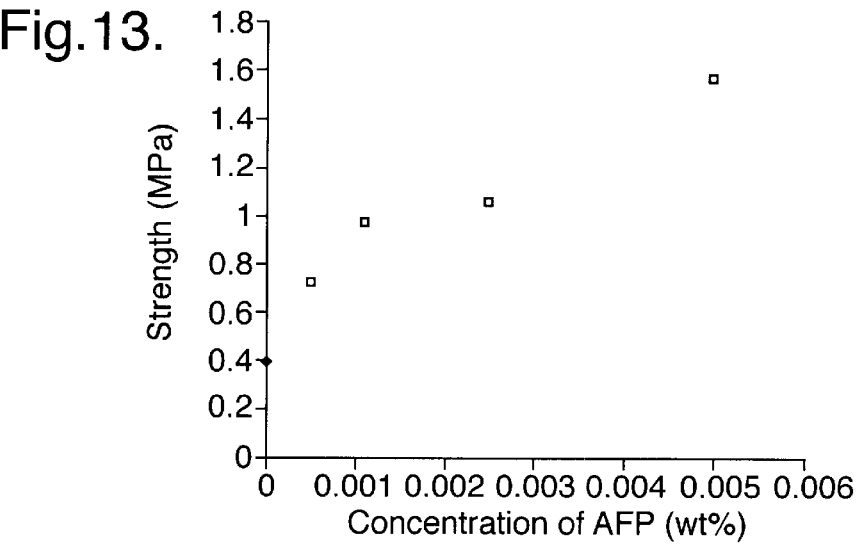

Results were compared with a control sample containing no AFP. Results are shown in FIGS. 12 and 13 where AFP containing examples are shown by (□) and control samples containing no AFP are shown by (♦).

Δ modulus, Δ modulus/original modulus, Δ strength and Δ strength/original strength were calculated. Results are shown in Table 4.

Figure 14:
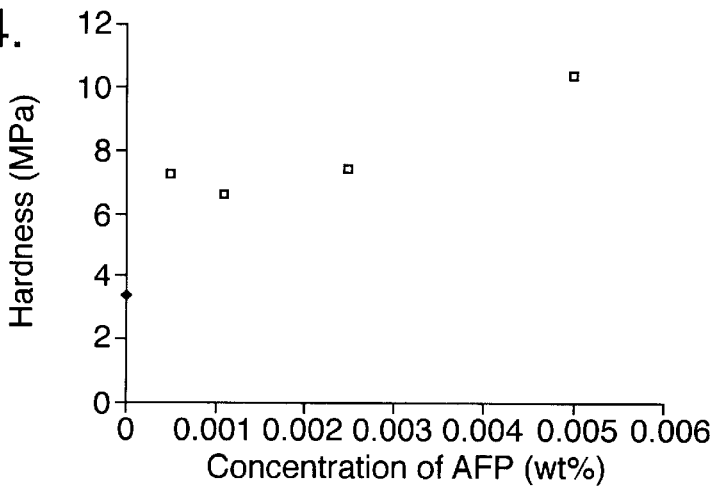

The Vickers Hardness was also determined using the method given in Example 3 results are shown in FIG. 14 where AFP containing examples are shown by (□) and control samples containing no AFP are shown by (♦).

$\Delta H_v/H_{v\ orig}$ and $\Delta H_v$ were calculated. Results are shown in Table 4.

TABLE 4

| Example | ΔE (MPa) | ΔE/ $E_{orig}$ | $\Delta \sigma_v$ (MPa) | $\Delta \sigma_v/\sigma_{v\ orig}$ | $\Delta H_v$ (MPa) | $\Delta H_v/H_v$ orig |
|---|---|---|---|---|---|---|
| 17 | 243 | 1.1 | 0.3 | 0.8 | 3.8 | 1.12 |
| 18 | 471 | 2.2 | 0.6 | 1.5 | 3.2 | 0.9 |
| 19 | 662 | 3.1 | 0.7 | 1.7 | 4.0 | 1.2 |
| 20 | 785 | 3.7 | 1.2 | 3.0 | 7.0 | 2.0 |

Examples 21–24

A water ice solution having the following composition was prepared as in Example 12;

|  | Weight % |
|---|---|
| Sucrose | 20.0 |
| Locust Bean Gum | 0.2 |
| Water | to 100 |

Total soluble solids; 20.2% by weight

Ice content at −18° C.; 70% by weight

After pasteurisation Type III AFP (as described in Wo 97/02343) was added to the water ice solution in the following concentrations;

Example 21—0.0005%

Example 22—0.0011%

Example 23—0.0025%

Example 24—0.005%

The water ice solution was then quiescently frozen. The water ice solution was poured into the split metal moulds used for the production of mechanical test pieces (see example 1). They were then placed in the cold store overnight to freeze quiescently at a temperature of −25° C. The next day, the test bars were demoulded, placed in polythene bags and stored at −25° C. until the day prior to mechanical testing.

The apparent elastic modulus and the flexure strength were determined using a four point bend test as described in Example 1.

Figure 15:
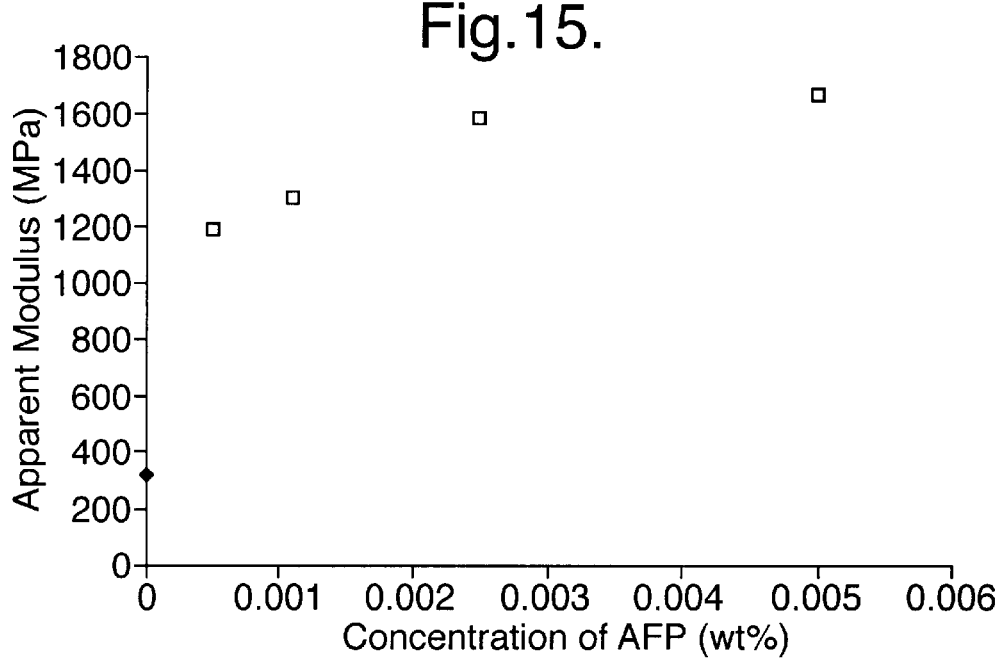
Figure 16:
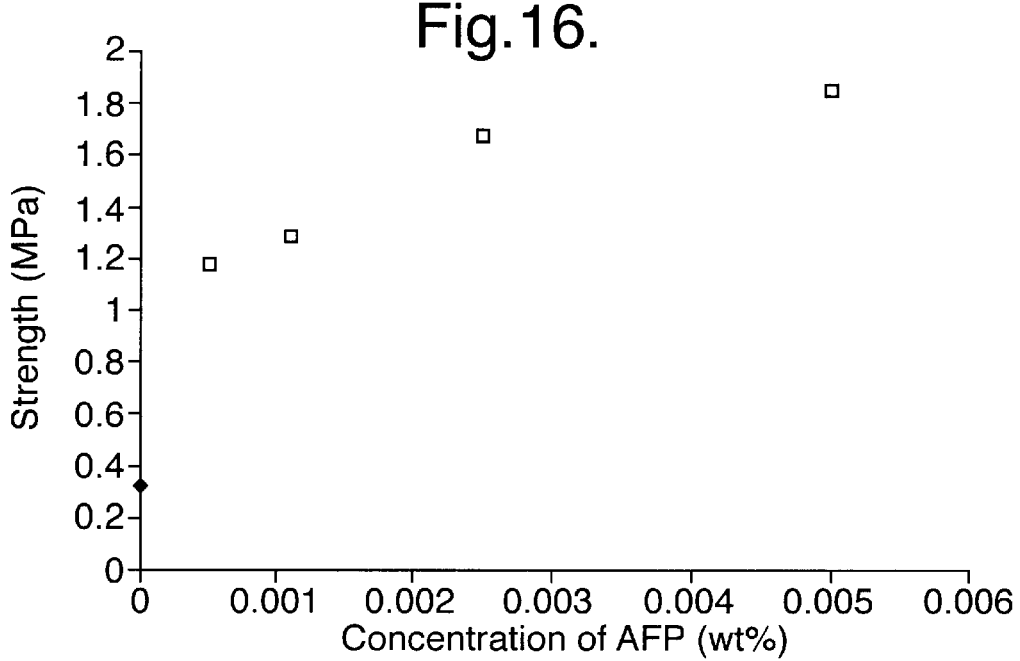

Results were compared with a control sample containing no AFP. Results are shown in FIGS. 15 and 16 where AFP containing examples are shown by (□) and control samples containing no AFP are shown by (♦).

Δ modulus, Δ modulus/original modulus, Δ strength and Δ strength/original strength were calculated. Results are shown in Table 5.

TABLE 5

| Example | ΔE (MPa) | ΔE/ $E_{orig}$ | $\Delta \sigma_v$ (MPa) | $\Delta \sigma_v/\sigma_{v\ orig}$ |
|---|---|---|---|---|
| 21 | 871 | 2.7 | 0.85 | 2.7 |
| 22 | 985 | 3.1 | 0.96 | 3.0 |
| 23 | 1269 | 4.0 | 1.4 | 4.2 |
| 24 | 1347 | 4.2 | 1.5 | 4.8 |

Examples 25 to 28

A water ice solution having the following composition was prepared as in Example 12;

|  | % by weight |
| --- | --- |
| Sucrose | 15 |
| Locust Bean Gum | 0.3 |
| Hydrolysed milk protein (Hyfoama DS**) | 0.1 |
| Type III AFP* | 0.0025 |
| Water | to 100 |

* as described in WO 97/02343
**Hyfoama DS is a trademark from Quest International Total Soluble Solids; 10.2% by weight
Ice content at −18° C.; 85% by weight The water ice solution was frozen in a Technohoy MF 75 scraped surface heat exchanger with the following overruns being introduced (volume fraction of air). The water ice was extruded at a temperature of from −2.5° C. to −3.1° C. The product was then hardened in a blast freezer at −35° C., then stored at −25° C.

Example 25—0% overrun (0)

Example 26—30% overrun (0.231)

Example 27—67% overrun (0.4)

Example 28—100% overrun (0.5)

The apparent elastic modulus and the flexure strength were determined using a four point bend test as described in Example 1.

Figure 17:
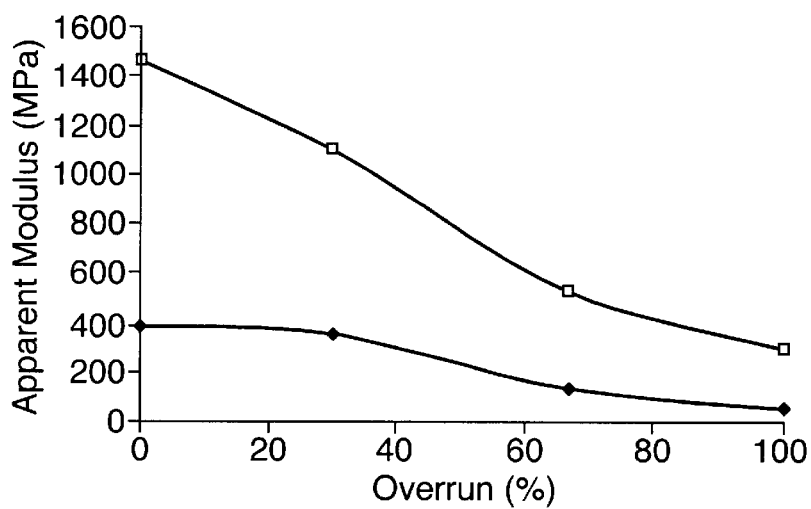
Figure 18:
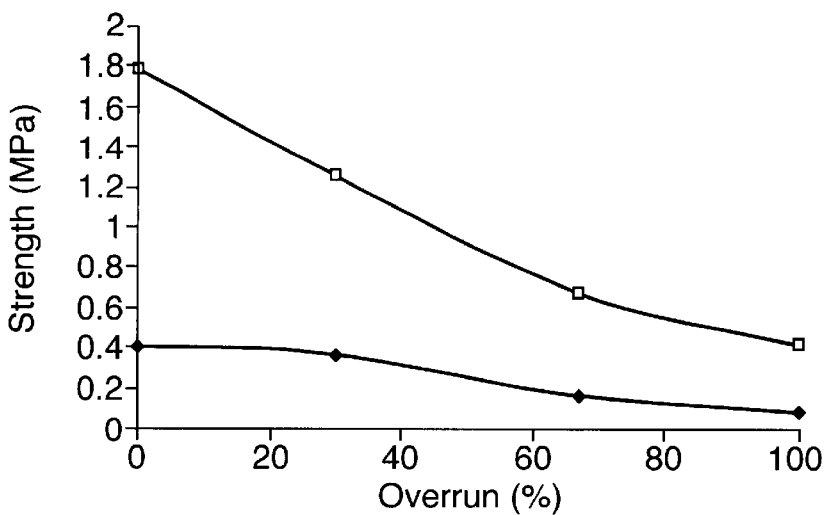

Results were compared with a control sample containing no AFP. Results are shown in FIGS. 17 and 18 where AFP containing examples are shown by (□) and control samples containing no AFP are shown by (♦).

Δ modulus, Δ modulus/original modulus, Δ strength and Δ strength/original strength were calculated. Results are shown in Table 6.

Figure 19:
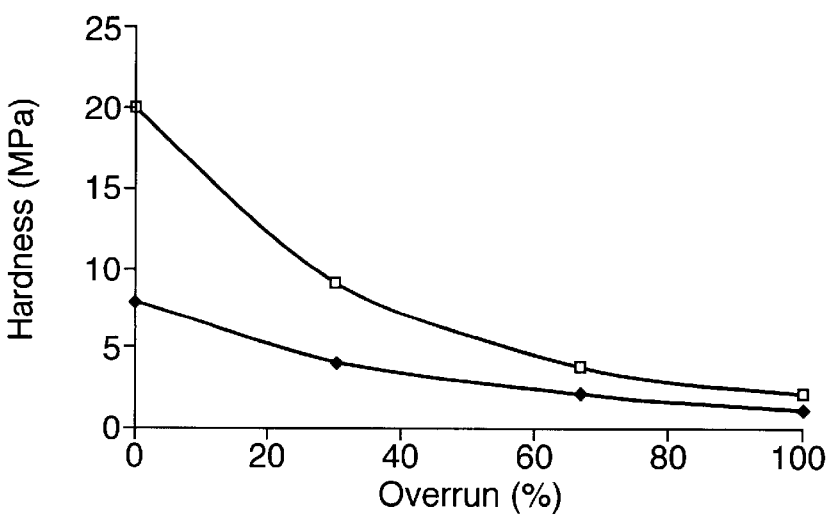

The Vickers Hardness was also determined using the method given in Example 3 results are shown in FIG. 19 where AFP containing examples are shown by (□) and control samples containing no AFP are shown by (♦).

$\Delta H_v/H_{v\,orig}$ and $\Delta H_v$ were calculated. Results are shown in Table 6.

TABLE 6

| Example | ΔE (MPa) | ΔE/ $E_{orig}$ | $\Delta\sigma_v$ (MPa) | $\Delta\sigma_v/\sigma_{v\,orig}$ | $\Delta H_v$ (MPa) | $\Delta H_v/H_v$ orig |
| --- | --- | --- | --- | --- | --- | --- |
| 25 | 1081 | 2.8 | 1.4 | 3.36 | 8.67 | 1.28 |
| 26 | 747 | 2.10 | 0.89 | 2.39 | 2.51 | 1.15 |
| 27 | 395 | 3.06 | 0.5 | 3.19 | 0.93 | 0.73 |
| 28 | 243 | 4.73 | 0.33 | 3.87 | 0.65 | 0.71 |

Examples 29 & 30, Comparative Example D

An ice cream composition was prepared having the following formulation;

|  | weight % |
| --- | --- |
| Sucrose | 13.000 |
| Skimmed Milk Powder | 10.000 |
| Butter fat | 8.000 |
| Maltodextrin 40 | 4.000 |
| MGP | 0.300 |
| Locust Bean Gum | 0.144 |
| Carageenan L100 | 0.016 |

-continued

|  | weight % |
| --- | --- |
| Flavour | 0.012 |
| Water | to 100 |

Total Soluble solids; 35% by weight
Ice content at −18° C.; 54% by weight

All the ice cream ingredients were mixed together using a high shear mixer for approximately 3 minutes. The water being added at a temperature of 80° C. The temperature of the water ice mix was approximately 55–65° C. after mixing. The mix was then homogenized (2000 psi) and passed through to a plate heat exchanger for pasteurization at 81° C. for 25 seconds. The mix was then cooled to approximately 4° C. in the plate heat exchanger prior to use.

After pasteurisation Type III AFP (as described in WO 97/02343) was added to the ice cream pre-mix in the following concentrations;

Example 29—0.0005% by weight

Example 30—0.005% by weight

Comparative Example D—no AFP

The ice cream pre-mix was then frozen using a Technohoy MF 75 scraped surface heat exchanger, no overrun was introduced into the ice cream. The ice cream was extruded at a temperature of from −4.4 to −5.4° C. The product was then hardened in a blast freezer at −35° C., then stored at −25° C.

Contiguity was measured as in Example 4.

Results are shown in Table 7

TABLE 7

| Example | Contiguity |
| --- | --- |
| 29 | 0.2 |
| 30 | 0.3 |
| D | 0.1 |

Examples 31 & 32, Comparative Example E

A water ice solution having the following composition was prepared as follows;

|  | Weight % |
| --- | --- |
| Sucrose | 20.0 |
| Locust Bean Gum | 0.2 |
| Water | to 100 |

Total soluble solids; 20.2% by weight
Ice content at −18° C.; 70% by weight

The water ice solution was prepared as in Example 12.

After pasteurisation Type III AFP (as described in WO 97/02343) was added to the water ice solution in the following concentrations;

Example 31—0.0005% by weight

Example 32—0.005% by weight

Comparative Example E—no AFP

The water ice solution was frozen in a Technohoy MF 75 scraped surface heat exchanger with no overrun being introduced. The water ice was extruded at a temperature of from −3.9° C. to −5.6° C. The product was then hardened in a blast freezer at −35° C., then stored at −25° C.

Contiguity was measured as in Example 4.
Results are shown in Table 8

TABLE 8

| Example | Contiguity |
|---|---|
| 31 | 0.24 |
| 32 | 0.22 |
| E | 0.11 |

Example 33, Comparative Example F

An ice cream composition was prepared having the following formulation;

| | Weight % |
|---|---|
| Sucrose | 13.000 |
| Skimmed Milk Powder | 10.000 |
| Butter fat | 8.000 |
| Maltodextrin 40 | 4.000 |
| MGP | 0.300 |
| Locust Bean Gum | 0.144 |
| Carageenan L100 | 0.016 |
| Flavour | 0.012 |
| Water | to 100 |

Total soluble solids; 35% by weight
Ice content at −18° C.; 54% by weight.

All the ice cream ingredients were mixed together using a high shear mixer for approximately 3 minutes. The water being added at a temperature of 80° C. The temperature of the water ice mix was approximately 55–65° C. after mixing.

The mix was then homogenized (2000 psi) and passed through to a plate heat exchanger for pasteurization at 81° C. for 25 seconds. The mix was then cooled to approximately 4° C. in the plate heat exchanger prior to use.

After pasteurisation Type III AFP (as described in WO 97/02343) was added to the ice cream pre-mix in the following concentrations;

Example 33—0.005% by weight

Comparative Example F—no AFP

The ice cream pre-mix was then frozen using a Technology MF 75 scraped surface heat exchanger, no overrun was introduced into the ice cream. The ice cream was extruded at a temperature of from −4.4 to −5.4° C. The product was then hardened in a blast freezer at −35° C., then stored at −25° C.

The Euler-Poincare characteristic was measured as in Example 5.

Results are shown in Table 9.

TABLE 9

| Example | Euler-Poincare characteristic (mm$^{-2}$) |
|---|---|
| 33 | −577 |
| F | 339 |

Example 34, Comparative Example G

A water ice solution having the following composition was prepared as follows;

| | Weight % |
|---|---|
| Sucrose | 20.0 |
| Locust Bean Gum | 0.2 |
| Water | to 100 |

Total soluble solids; 20.2% by weight
Ice content at −18° C.; 70% by weight

The water ice solution was prepared as in Example 12.

After pasteurisation Type III AFP (as described in WO 97/02343) was added to the water ice solution in the following concentrations;

Example 34—0.005% by weight

Comparative Example G—no AFP

The water ice solution was frozen quiescently as described in Example 24 with no overrun being introduced.

The Euler-Poincare characteristic was measured as in Example 5.

Results are shown in Table 10.

TABLE 10

| Example | Euler-Poincare characteristic (mm$^{-2}$) |
|---|---|
| 34 | −383 |
| G | 4.3 |

Example 35

A milk ice solution having the following composition was prepared as follows;

| | % (w/w) |
|---|---|
| Sucrose | 13.2 |
| Corn Syrup | 2.8 |
| Whole Milk Powder | 11.2 |
| Skimmed Milk Powder | 5.0 |
| Stabiliser | 0.27 |
| Emulsifier | 0.20 |
| Colour/Flavour | 0.06 |
| AFP* | 0.005 |
| Water | to 100 |

*as described in WO 97/02343

All the milk ice ingredients except AFP were mixed together using a high shear mixer for approximately 3 minutes. The water being added at a temperature of 80° C. The temperature of the milk ice mix was approximately 55–65° C. after mixing.

The mix was then homogenized (2000 psi) and passed through to a plate heat exchanger for pasteurisation at 81° C. for 25 seconds. The mix was then cooled to approximately 4° C. in the plate heat exchanger prior to use.

The mix was then portioned into two halves, and Type III AFP (as described in WO 97/02343) was added to one half.

The milk ice solutions were then quiescently frozen. The milk ice solution was poured into the split metal moulds used for the production of mechanical test pieces (see example 1). They were then placed in the cold store overnight to freeze quiescently at a temperature at −25° C.

The next day, the test bars were demoulded, placed in polythene bags and stored at −25° C. until the day prior to mechanical testing.

The apparent elastic modulus and the flexure strength were determined using a four point bend test as described in Example 1.

Results for the milk ice containing AFP were compared with the control sample containing no AFP.

Δ modulus, Δ modulus/original modulus, Δ strength and Δ strength/original strength were calculated. Results are shown in Table 11.

TABLE 11

| Example | ΔE (MPa) | ΔE/E$_{orig}$ | Δσ$_u$ (MPa) | Δσ$_u$/σ$_{u\ orig}$ |
|---|---|---|---|---|
| 35 | 756 | 16.2 | 1.81 | 6.68 |

Example 36

A milk ice solution having the following composition was prepared as follows;

| | % (w/w) |
|---|---|
| Sucrose | 13.2 |
| Corn Syrup | 2.8 |
| Whole Milk Powder | 11.2 |
| Skimmed Milk Powder | 5.0 |
| Stabiliser | 0.27 |
| Emulsifier | 0.20 |
| Colour/Flavour | 0.06 |
| AFP* | 0.005 |
| Water | to 100 |

*as described in WO 97/02343

All the milk ice ingredients except AFP were mixed together using a high shear mixer for approximately 3 minutes. The water being added at a temperature of 80° C. The temperature of the milk ice mix was approximately 55–65° C. after mixing.

The mix was then homogenized (2000 psi) and passed through to a plate heat exchanger for pasteurisation at 81° C. for 25 seconds. The mix was then cooled to approximately 4° C. in the plate heat exchanger prior to use.

The mix was then portioned into two halves, and Type III AFP (as described in WO 97/02343) was added to one half.

The milk ice solutions were frozen in a Technology MF 75 scraped surface heat exchanger with no overrun being introduced. The water ice was extruded at a temperature of from −3.9° C. to −5.6° C. The product was then hardened in a blast freezer at −35° C., then stored at −25° C.

The apparent elastic modulus and the flexure strength were determined using a four point bend test as described in Example 1.

Results for the milk ice containing AFP were compared with the control sample containing no AFP.

Δ modulus, Δ modulus/original modulus, Δ strength and Δ strength/original strength were calculated.

Results are shown in Table 12.

TABLE 12

| Example | ΔE (MPa) | ΔE/E$_{orig}$ | Δσ$_u$ (MPa) | Δσ$_u$/σ$_{u\ orig}$ |
|---|---|---|---|---|
| 36 | 290 | 5.08 | 0.968 | 4.17 |

Example 37

An ice cream composition was prepared having the following formulation;

| | weight % |
|---|---|
| Sucrose | 13.500 |
| Skimed Milk Concentrate (30% solids) | 24.000 |
| Cream (40% fat) | 43.000 |
| Egg Yolk (unsweetened) | 4.500 |
| Vanilla flavour | 1.000 |
| Water | to 100 |

Total Soluble solids; 45% by weight
Ice content at −18° C.; 46% by weight

All the ice cream ingredients were mixed together using a high shear mixer for approximately 3 minutes. The water being added at a temperature of 80° C. The temperature of the ice cream mix was approximately 38–45° C. after mixing.

The mix was then homogenized (2000 psi) and passed through to a plate heat exchanger for pasteurization at 81° C. for 25 seconds. The mix was then cooled to approximately 4° C. in the plate heat exchanger prior to use.

After pasteurisation Type I AFP (from AF Protein) was added to the ice cream pre-mix in the following concentration;

Example 37—0.001% by weight

The ice cream pre-mix was then frozen using a Technohoy MF 75 scraped surface heat exchanger with no overrun being introduced. The ice cream was extruded at a temperature of from −4.8° C. to −5.5° C. The product was then hardened in a blast freezer at −35° C., then stored at −25° C.

The apparent elastic modulus and the flexure strength were determined using a four point bend test as described in Example 1.

Results were compared with relevant control sample containing no AFP.

Δ modulus, Δ modulus/original modulus, Δ strength and Δ strength/original strength were calculated. Results are shown in Table 13.

TABLE 13

| Example | ΔE (MPa) | ΔE/E$_{orig}$ | Δσ$_u$ (MPa) | Δσ$_u$/σ$_{u\ orig}$ |
|---|---|---|---|---|
| 37 | 138 | 4.2 | 0.408 | 1.09 |

Example 38

A water ice solution having the following composition was prepared as follows;

|  | % by weight |
| --- | --- |
| Sucrose | 18 |
| Locust Bean Gum | 0.18 |
| Hydrolysed milk protein (Hyfoama DS) | 0.1 |
| Grass AFP solution* | 30.0 |
| water | to 100 |

*as described in WO 98/04699. The amount of grass AFP solution used was determined by the minimum amount required to provide the recrystallisation inhibition as defined by Example 2.

Total soluble solids; 18% by weight
Ice Content at −18° C.; 73% by weight

A control mix was made without AFP, the grass AFP solution being replaced by 30% by weight water.

All the water ice ingredients except AFP were mixed together using a high shear mixer for approximately 3 minutes. The water being added at a temperature of 80° C. The temperature of the water ice mix was approximately 55–65° C. after mixing.

The mix was then passed through to a plate heat exchanger for pasteurization at 81° C. for 25 seconds. The mix was then cooled to approximately 4° C. in the plate heat exchanger prior to use.

The AFP was added after pasteurisation.

The water ice solution was frozen in a Technohoy MF 75 scraped surface heat exchanger with no overrun introduced. The water ice was extruded at a temperature of from −2.6° C. to −3.6° C. The product was then hardened in a blast freezer at −35° C., then stored at −25° C.

The apparent elastic modulus and the flexure strength were determined using a four point bend test as described in Example 1.

Results were compared with the control sample containing no AFP.

Δ modulus, Δ modulus/original modulus, Δ strength and Δ strength/original strength were calculated. Results are shown in Table 14.

TABLE 14

| Example | ΔE (MPa) | ΔE/ $E_{orig}$ | Δσ$_u$ (MPa) | Δσ$_u$/ σ$_{u\,orig}$ |
| --- | --- | --- | --- | --- |
| 38 | 230 | 0.84 | 0.615 | 1.03 |

Example 39

A water ice solution having the following composition was prepared as follows;

|  | % by weight |
| --- | --- |
| Sucrose | 18 |
| Locust Bean Gum | 0.18 |
| Hydrolysed milk protein (Hyfoama DS**) | 0.1 |
| Grass AFP solution* | 30.0 |
| water | to 100 |

*as described in WO 98/04699. The amount of grass AFP solution used was determined by the minimum amount required to provide the recrystallisation inhibition as defined by Example 2.
**Hyfoama DS is a Trademark of Quest International.

Total soluble solids; 18% by weight
Ice Content at −18° C.; 73% by weight

A control mix was made without AFP, the grass AFP solution being replaced by 30% by weight water.

All the water ice ingredients except AFP were mixed together using a high shear mixer for approximately 3 minutes. The water being added at a temperature of 80° C. The temperature of the water ice mix was approximately 55–65° C. after mixing.

The mix was then passed through to a plate heat exchanger for pasteurization at 81° C. for 25 seconds. The mix was then cooled to approximately 4° C. in the plate heat exchanger prior to use.

After pasteurisation the AFP solution was added to the water ice solution.

The water ice solution was then quiescently frozen. The water ice solution was poured into the split metal moulds used for the production of mech anical test pieces (see example 1). They were then placed in the cold store overnight to freeze quiescently at a temperature of −25° C.

The next day, the test bars were demoulded, placed in polythene bags and stored at −25° C. until the day prior to mechanical testing.

The apparent elastic modulus was determined using a four point bend test as described in Example 1.

Results were compared with the control sample containing no AFP.

Δ modulus and Δ modulus/original modulus were calculated. Results are shown in Table 15.

TABLE 15

| Example | ΔE (MPa) | ΔE/ $E_{orig}$ |
| --- | --- | --- |
| 39 | 146 | 2.59 |

Example 40

Production of a complex shape water ice using a single piece silicone rubber mould.

A water ice solution having the following composition was prepared as follows ;

|  | % (w/w) |
| --- | --- |
| Sucrose | 10.0 |
| Glucose | 5.0 |
| Locust Bean Gum | 0.2 |
| Citric Acid | 0.5 |
| AFP * | 0.005 |
| Colour/Flavour | 0.2 |
| Water | to 100 |

* as described in WO 97/02343

All the water ice ingredients except AFP were mixed together using a high shear mixer for approximately 3 minutes. The water being added at a temperature of 80° C. The temperature of the water ice mix was approximately 55–65° C. after mixing.

The mix was then homogenized (2000 psi) and passed through to a plate heat exchanger for pasteurization at 81° C. for 25 seconds. The mix was then cooled to approximately 4° C. in the plate heat exchanger prior to use.

The mix was then portioned into two halves, and AFP added to one half.

Portions of each water ice mix were aliquoted into silicone rubber moulds in the shape of a crocodile. The overall dimensions of the crocodile were approximately 15 cm long and 3 cm wide (at its widest point). The legs were approximately 2 cm long and 0.5 cm thick. Mix was frozen for 2 hours in a blast freezer at −35° C. The moulds were then transferred to a cold store at −25° C. overnight prior to demoulding.

On attempting to demould the water ice crocodile which did not contain AFP, the small protrusions (including the legs and the tail) were too fragile, and broke off as the product was removed from the mould. In contrast, the crocodile containing AFP could be removed from the mould in one piece, with all small protrusions remaining intact.

What is claimed is:

1. An ice confection comprising an antifreeze protein, wherein Δ modulus/original modulus $\geq 0.4$, and/or Δ strength/original strength $\geq 0.4$; providing that when Δ modulus/original modulus $\leq 6.0$, Δ modulus $\geq 50$ Mpa, and/or when Δ strength/original strength $\leq 2.0$, Δ strength $\geq 0.2$ Mpa, wherein said ice confection is selected from an unaerated ice cream, an unaerated or aerated water ice, or unaerated ice milk.

2. An ice confection according to claim 1, wherein $\Delta H_v/H_{v\ orig} \geq 0.3$, providing that when $\Delta H_v/H_{v\ orig} \leq 5.0$, $\Delta H_v' \geq 0.3$.

3. An ice confection according to claim 1, wherein the antifreeze protein is chosen such that it provides an aspect ratio of more than 1.9 to the crystal.

4. An ice confection according to claim 1, wherein the antifreeze protein is AFP Type III HPLC 12.

5. An ice confection according to claim 1, wherein the antifreeze protein is present at a concentration of at least 0.0005% by weight.

6. An ice confection according to claim 1, wherein the ice confection is unaerated.

7. An ice confection according to claim 1, wherein the ice confection is an unaerated ice cream, water ice or milk ice.

8. An ice confection according to claim 1 having a contiguity of at least 0.2 and an ice content of from 50 to 90% by weight when measured at −18° C.

9. An ice confection according to claim 1 having a Euler-Poincare characteristic of less than −150 mm$^{-2}$ and an ice content of from 50 to 90% by weight when measured at −180° C.

* * * * *